US012558930B2

(12) United States Patent
Thompson

(10) Patent No.: US 12,558,930 B2
(45) Date of Patent: Feb. 24, 2026

(54) DETACHABLE DOLLY TRAINING CONNECTOR

(71) Applicant: ORBIS Corporation, Oconomowoc, WI (US)

(72) Inventor: Benjamin J. Thompson, Watertown, WI (US)

(73) Assignee: ORBIS Corporation, Oconomowoc, WI (US)

( * ) Notice: Subject to any disclaimer, the term of this patent is extended or adjusted under 35 U.S.C. 154(b) by 962 days.

(21) Appl. No.: 17/591,238

(22) Filed: Feb. 2, 2022

(65) Prior Publication Data

US 2022/0250422 A1 Aug. 11, 2022

Related U.S. Application Data

(60) Provisional application No. 63/147,091, filed on Feb. 8, 2021.

(51) Int. Cl.
*F16B 2/02* (2006.01)
*B60D 1/02* (2006.01)
*B62B 3/02* (2006.01)

(52) U.S. Cl.
CPC ............... *B60D 1/025* (2013.01); *B62B 3/02* (2013.01); *F16B 2/02* (2013.01); *B62B 2207/00* (2013.01)

(58) Field of Classification Search
CPC .... B60D 1/025; B60D 2001/005; B62B 3/02; B62B 5/0079; B62B 5/0093; B62B 2207/00; F16B 2/02; F16B 2/04; F16B 2/185
USPC ...................................... 280/491.5
See application file for complete search history.

(56) References Cited

U.S. PATENT DOCUMENTS

| | | | |
|---|---|---|---|
| 1,778,654 | A | 10/1930 | Wright |
| 2,118,280 | A | 5/1938 | Wilson |
| 2,689,469 | A | 9/1954 | Happe et al. |
| 2,706,643 | A | 4/1955 | Babcock |
| 2,707,351 | A | 5/1955 | Walker |
| 2,947,548 | A | 8/1960 | Bard |
| 2,990,191 | A | 6/1961 | Black |
| 3,073,274 | A | 1/1963 | Lamb |
| 3,208,768 | A | 9/1965 | Hulbert |

(Continued)

FOREIGN PATENT DOCUMENTS

| | | |
|---|---|---|
| CA | 99478 | 4/2003 |
| CA | 2757947 A1 | 5/2012 |

(Continued)

OTHER PUBLICATIONS

Smith Companies, "New! Dura-Ply Pallets," www.smithcos.com, date unknown, 1 page.

(Continued)

*Primary Examiner* — Valentin Neacsu
*Assistant Examiner* — Felicia L. Brittman-Alabi
(74) *Attorney, Agent, or Firm* — Richard C. Himelhoch; UB Greensfelder LLP

(57) ABSTRACT

The invention is directed to a detachable dolly training connector. The connector includes a first detachable connector for connecting to a first mobile platform or dolly, coupled to a second detachable connector for connecting to a second mobile platform or dolly. The first detachable connector can include an expandable and retractable pin arrangement. The second detachable connector can include a clamp.

3 Claims, 16 Drawing Sheets

(56)                References Cited

U.S. PATENT DOCUMENTS

| | | | |
|---|---|---|---|
| 3,420,379 A | 1/1969 | Berryman |
| 3,511,191 A | 5/1970 | Barry, Jr. et al. |
| 3,581,681 A | 6/1971 | Newton |
| 3,661,099 A | 5/1972 | Shelor |
| 3,685,461 A | 8/1972 | Belcher |
| 3,689,098 A | 9/1972 | Rubin |
| 3,707,929 A | 1/1973 | Lauffer |
| 3,719,157 A | 3/1973 | Arcocha et al. |
| 3,720,176 A | 3/1973 | Munroe |
| 3,757,704 A | 9/1973 | Allgeyer et al. |
| 3,814,778 A | 6/1974 | Hosoda et al. |
| 3,846,348 A | 11/1974 | Horst et al. |
| 4,060,252 A | 11/1977 | Mowery |
| 4,077,644 A | 3/1978 | Roby et al. |
| 4,159,681 A | 7/1979 | Vandament |
| 4,203,609 A | 5/1980 | Mitchell et al. |
| 4,230,049 A | 10/1980 | Horne |
| 4,241,555 A | 12/1980 | Dickens et al. |
| D257,823 S | 1/1981 | Maza et al. |
| 4,272,100 A | 6/1981 | Kassai |
| 4,440,708 A | 4/1984 | Haataja et al. |
| 4,467,728 A | 8/1984 | Horne |
| 4,519,503 A | 5/1985 | Wilson |
| 4,720,115 A | 1/1988 | Rehrig |
| 4,742,781 A | 5/1988 | Shuert |
| 4,822,066 A | 4/1989 | Rehrig |
| 4,824,129 A | 4/1989 | Rehrig |
| 4,838,176 A | 6/1989 | Bowser, Sr. et al. |
| 4,936,458 A | 6/1990 | Tabler et al. |
| 5,074,572 A | 12/1991 | Delmerico et al. |
| D327,557 S | 6/1992 | Juergens |
| D328,172 S | 7/1992 | Juergens |
| 5,184,836 A | 2/1993 | Andrews, Jr. et al. |
| 5,186,330 A | 2/1993 | McClure |
| 5,257,794 A | 11/1993 | Nakamura |
| 5,299,816 A | 4/1994 | Vom Braucke et al. |
| 5,299,817 A | 4/1994 | Chang |
| 5,329,862 A | 7/1994 | Breezer et al. |
| D349,995 S | 8/1994 | Cassel et al. |
| 5,349,749 A | 9/1994 | Fiedler |
| 5,401,456 A | 3/1995 | Alesi, Jr. et al. |
| 5,413,052 A | 5/1995 | Breezer et al. |
| 5,445,396 A | 8/1995 | Sebor |
| 5,484,150 A | 1/1996 | Yasutomi |
| 5,503,417 A | 4/1996 | Murphy |
| D370,757 S | 6/1996 | Loftus et al. |
| 5,528,994 A | 6/1996 | Iseli |
| 5,538,267 A | 7/1996 | Pasin et al. |
| 5,556,118 A | 9/1996 | Kern et al. |
| 5,564,805 A | 10/1996 | Dickinson |
| D376,453 S | 12/1996 | Park |
| 5,590,606 A | 1/1997 | Crews et al. |
| 5,592,885 A | 1/1997 | Young, Jr. et al. |
| D378,154 S | 2/1997 | Presnell |
| 5,636,577 A | 6/1997 | Gow |
| 5,683,097 A | 11/1997 | Fenton et al. |
| 5,687,652 A | 11/1997 | Ruma |
| 5,695,205 A | 12/1997 | Liu |
| 5,706,738 A | 1/1998 | Rapeli |
| 5,711,540 A | 1/1998 | Nesting |
| D390,314 S | 2/1998 | Chen |
| D398,434 S | 9/1998 | Agtuca |
| 5,823,549 A | 10/1998 | Morgan, Jr. |
| 5,829,595 A | 11/1998 | Brown et al. |
| 5,832,841 A | 11/1998 | Crews et al. |
| 5,833,207 A | 11/1998 | Hagenhoff et al. |
| 5,875,904 A | 3/1999 | Vorstenbosch |
| 5,876,049 A | 3/1999 | Spear et al. |
| 5,881,902 A | 3/1999 | Ackermann |
| 5,896,992 A | 4/1999 | McGrath |
| 5,921,566 A | 7/1999 | Kern et al. |
| 6,012,587 A | 1/2000 | McCullough |
| D420,188 S | 2/2000 | Betcher |
| 6,024,376 A | 2/2000 | Golichowski et al. |
| 6,036,219 A | 3/2000 | Oefelein et al. |
| 6,095,533 A | 8/2000 | Balolia |
| 6,105,980 A | 8/2000 | Cino et al. |
| 6,199,879 B1 | 3/2001 | Cino et al. |
| 6,206,385 B1 | 3/2001 | Kern et al. |
| 6,209,464 B1 | 4/2001 | Elder |
| 6,224,072 B1 | 5/2001 | Weck et al. |
| 6,257,152 B1 | 7/2001 | Liu |
| 6,260,706 B1 | 7/2001 | Koefelda |
| 6,273,259 B1 | 8/2001 | Stahl |
| D448,536 S | 9/2001 | Treschitta |
| 6,305,301 B1 | 10/2001 | Piper, Jr. et al. |
| 6,345,828 B1 | 2/2002 | Pool et al. |
| 6,349,951 B1 | 2/2002 | Mogensen et al. |
| 6,357,366 B1 | 3/2002 | Frankenberg |
| D456,972 S | 5/2002 | Blason et al. |
| D459,049 S | 6/2002 | Apps et al. |
| D459,059 S | 6/2002 | Apps et al. |
| 6,420,459 B1 | 7/2002 | Horold |
| 6,446,988 B1 | 9/2002 | Kho |
| 6,499,750 B1 | 12/2002 | Michelau |
| D472,028 S | 3/2003 | Stahl |
| 6,607,199 B2 | 8/2003 | Gruber |
| 6,659,020 B1 | 12/2003 | Ball |
| 6,675,723 B2 | 1/2004 | Sukeva |
| 6,718,888 B2 | 4/2004 | Muirhead |
| 6,748,876 B2 | 6/2004 | Preisler et al. |
| 6,758,148 B2 | 7/2004 | Torrey et al. |
| 6,857,642 B2 | 2/2005 | Gruber |
| 6,877,764 B2 | 4/2005 | Sagol |
| 6,886,787 B2 | 5/2005 | Stahl |
| 6,971,518 B1 | 12/2005 | Lowry |
| 6,974,140 B2 | 12/2005 | Neuman |
| 6,979,005 B1 | 12/2005 | McLerran |
| 6,998,433 B2 | 2/2006 | Overholt et al. |
| 7,036,833 B1 | 5/2006 | Berna et al. |
| 7,044,065 B2 | 5/2006 | Arai et al. |
| 7,059,617 B1 | 6/2006 | Verna |
| 7,066,477 B2 | 6/2006 | Dubois et al. |
| 7,104,553 B2 | 9/2006 | Gruber |
| 7,201,385 B2 | 4/2007 | Renz et al. |
| 7,219,905 B1 | 5/2007 | Wilson |
| D570,068 S | 5/2008 | Dukes |
| 7,413,698 B2 | 8/2008 | Bearse et al. |
| 7,458,589 B2 | 12/2008 | Vanderberg et al. |
| 7,462,009 B2 | 12/2008 | Hartmann et al. |
| 7,874,256 B2 | 1/2011 | Muirhead |
| 7,914,018 B1 | 3/2011 | Rezler |
| 8,141,500 B2 | 3/2012 | Naidu et al. |
| 8,181,580 B2 | 5/2012 | Roth et al. |
| 8,215,244 B2 | 7/2012 | Apps |
| 8,261,673 B2 | 9/2012 | Ingham |
| 8,317,204 B2 | 11/2012 | Meers et al. |
| 8,403,344 B2 | 3/2013 | Carver et al. |
| 8,418,632 B2 | 4/2013 | Linares |
| 8,424,901 B2 | 4/2013 | Vanderberg et al. |
| 8,544,648 B2 | 10/2013 | Cleveland et al. |
| 8,567,324 B1 | 10/2013 | Paradis et al. |
| 8,740,228 B2 | 6/2014 | Patterson et al. |
| 8,827,305 B2 | 9/2014 | Saito et al. |
| 8,979,098 B2 | 3/2015 | Wang et al. |
| 9,067,614 B2 | 6/2015 | Vanderberg et al. |
| 9,102,437 B2 | 8/2015 | Frankenberg |
| 9,156,588 B2 | 10/2015 | Hassell |
| 9,327,873 B2 | 5/2016 | Frankenberg |
| 9,440,594 B1 | 9/2016 | Clamont Bello et al. |
| 9,522,760 B2 | 12/2016 | Frankenberg |
| 9,561,815 B2 | 2/2017 | Choi |
| 9,573,421 B2 | 2/2017 | Tiilikainen et al. |
| 9,601,693 B1 | 3/2017 | Henri et al. |
| 9,937,942 B2 | 4/2018 | Nussbaum et al. |
| 9,988,062 B2 | 6/2018 | Stahl et al. |
| 10,065,666 B2 | 9/2018 | Nussbaum et al. |
| 10,086,973 B2 | 10/2018 | Nussbaum et al. |
| 10,279,830 B2 | 5/2019 | Stahl et al. |
| 10,322,849 B2 | 6/2019 | Hassell |
| 10,442,450 B2 | 10/2019 | Abohammdan et al. |
| 11,167,779 B2 | 11/2021 | Cook |
| 11,173,939 B2 | 11/2021 | Hassell |
| 11,186,409 B2 | 11/2021 | Wood et al. |

(56) References Cited

U.S. PATENT DOCUMENTS

| | | | |
|---|---|---|---|
| 2001/0005070 A1 | 6/2001 | Kemnitzer | |
| 2002/0195027 A1 | 12/2002 | Mallan et al. | |
| 2003/0205877 A1 | 11/2003 | Verna et al. | |
| 2003/0213878 A1 | 11/2003 | Stahl | |
| 2003/0234517 A1 | 12/2003 | Sagol | |
| 2004/0050742 A1 | 3/2004 | Gruber | |
| 2004/0168618 A1 | 9/2004 | Muirhead | |
| 2004/0232660 A1 | 11/2004 | Chen | |
| 2005/0006861 A1 | 1/2005 | Dubois et al. | |
| 2005/0103237 A1 | 5/2005 | Moore, Jr. et al. | |
| 2006/0011108 A1 | 1/2006 | Abu-Isa et al. | |
| 2007/0059119 A1 | 3/2007 | Hadar | |
| 2008/0149111 A1 | 6/2008 | Harrison et al. | |
| 2008/0197592 A1 | 8/2008 | Dukes | |
| 2008/0296183 A1 | 12/2008 | Meers | |
| 2009/0085315 A1 | 4/2009 | Meers et al. | |
| 2009/0116925 A1 | 5/2009 | Juchniewicz et al. | |
| 2010/0074721 A1 | 3/2010 | Meers | |
| 2012/0049472 A1 | 3/2012 | Patterson et al. | |
| 2012/0111238 A1 | 5/2012 | Frankenberg | |
| 2012/0267869 A1 | 10/2012 | Hassell | |
| 2013/0187352 A1 | 7/2013 | Hassell et al. | |
| 2013/0193673 A1 | 8/2013 | Vanderberg et al. | |
| 2013/0248674 A1 | 9/2013 | Johnson et al. | |
| 2013/0285342 A1 | 10/2013 | Frankenberg | |
| 2014/0175765 A1 | 6/2014 | Tiilikainen et al. | |
| 2014/0183832 A1 | 7/2014 | Wang et al. | |
| 2014/0231429 A1 | 8/2014 | Frankenberg | |
| 2014/0319302 A1 | 10/2014 | Baltz | |
| 2015/0203138 A1 | 7/2015 | Hassell et al. | |
| 2016/0009448 A1 | 1/2016 | Hassell | |
| 2016/0137215 A1 | 5/2016 | Ondrasik | |
| 2016/0207558 A1 | 7/2016 | Frankenberg | |
| 2017/0151974 A1 | 6/2017 | Stahl et al. | |
| 2017/0190342 A1 | 7/2017 | Nussbaum et al. | |
| 2017/0190343 A1 | 7/2017 | Nussbaum et al. | |
| 2017/0190465 A1 | 7/2017 | Nussbaum et al. | |
| 2018/0127010 A1 | 5/2018 | Stahl et al. | |
| 2018/0274572 A1* | 9/2018 | Wang ........................ | F16B 2/12 |
| 2019/0126964 A1 | 5/2019 | Abohammdan et al. | |
| 2020/0055534 A1 | 2/2020 | Hassell | |

FOREIGN PATENT DOCUMENTS

| | | | | |
|---|---|---|---|---|
| CA | 3009156 C | 2/2020 | | |
| CA | 3009998 C | 2/2020 | | |
| CA | 3004402 C | 5/2020 | | |
| CA | 3009972 C | 9/2020 | | |
| CA | 3042702 C | 9/2020 | | |
| CN | 2246607 Y | 2/1997 | | |
| DE | 3815990 A1 | 2/1989 | | |
| DE | 3825219 A1 | 2/1990 | | |
| DE | 3917279 A1 | 11/1990 | | |
| DE | 20213777 U1 | 5/2003 | | |
| DE | 102010015264 A1 | 10/2011 | | |
| EP | 0675829 B1 | 5/1996 | | |
| EP | 0807563 A2 | 11/1997 | | |
| EP | 1012056 B1 | 7/2001 | | |
| EP | 1277663 A2 | 1/2003 | | |
| EP | 1306312 A1 | 5/2003 | | |
| EP | 2465784 A2 | 6/2012 | | |
| FR | 1596011 A | 6/1970 | | |
| GB | 2280166 A | 1/1995 | | |
| GB | 2334007 A | 8/1999 | | |
| GB | 2359061 A | 8/2001 | | |
| GB | 2377689 A | 1/2003 | | |
| JP | 404081359 A | 3/1992 | | |
| JP | 406206545 A | 7/1994 | | |
| MX | 2018005744 A | 5/2018 | | |
| MX | 2018007522 A | 11/2018 | | |
| MX | 2018008022 A | 11/2018 | | |
| MX | 2018008121 A | 5/2019 | | |
| MX | 2019005369 A | 10/2019 | | |
| SU | 1588619 A1 | 8/1990 | | |
| WO | 9316927 A1 | 9/1993 | | |
| WO | 03035495 A1 | 5/2003 | | |
| WO | 2006071920 A2 | 7/2006 | | |
| WO | 2014120022 A1 | 8/2014 | | |
| WO | 2017078753 A1 | 5/2017 | | |
| WO | 2017116682 A1 | 7/2017 | | |
| WO | 2017116683 A1 | 7/2017 | | |
| WO | 2017117097 A1 | 7/2017 | | |
| WO | 2018089503 A1 | 5/2018 | | |
| WO | WO-2020264430 A1 * | 12/2020 | ............... | B60R 9/06 |

OTHER PUBLICATIONS

Holden Plastics Corporation, "Thermosets: Engineering Plastics for Demanding Applications," Jobshop.com, 2005, 3 pages 2005.
Wiggins Plastics, Inc. "Thermosets: Engineering Plastics for Demanding Applications," JobShop.com, 1996-2014, 2 pages.

* cited by examiner

14

12

DETACHABLE DOLLY TRAINING CONNECTOR

CROSS-REFERENCE TO RELATED APPLICATIONS

The present invention claims priority to and the benefit of U.S. Provisional Patent Application No. 63/147,091 filed Feb. 8, 2021, the contents of which are incorporated herein by reference and made a part hereof.

FEDERALLY SPONSORED RESEARCH OR DEVELOPMENT

N/A

FIELD OF THE INVENTION

The present invention is directed toward detachable connectors for creating a train of mobile platforms.

DESCRIPTION OF THE PRIOR ART

To limit the number of trips required to move goods, two or more mobile platforms (used to transport the goods) are often trained together. The most common method used to connect the platforms is a fixed tongue in one platform that attaches to a fixed pin hitch in another platform to create a train of multiple mobile platforms. This method requires the mobile platforms to have the tongue and pin hitch installed in each platform.

The present invention can be used to connect mobile platforms as needed, without requiring the platforms to be fitted with the tongue or pin hitch structures.

SUMMARY OF THE INVENTION

The present invention is directed to a detachable dolly training connector. The connector clamps on to the mobile platforms when needed and easily detaches when not required. This reduces costs because the mobile platforms do not need to be constructed with the tongue and pin hitch structures. Instead, the connector can be applied as needed.

In accordance with one aspect of the invention, a detachable dolly train connector is provided. The detachable dolly connector comprises a first detachable connector for detachably connecting to a first mobile platform and a second detachable connector coupled to the first detachable connector for detachably connecting to a second mobile platform.

The first detachable connector can comprise a first end having a first arm including an outwardly extending pin and a second arm including an outwardly extending pin. The first detachable connector can include a second end having an aperture for engaging a post.

The first detachable connector can also include an apparatus for expanding and retracting the first arm and the second arm with respect to each other to engage and disengage the second mobile platform. The apparatus for expanding and retracting the first arm and the second arm with respect to each other can comprise a first segment connected to the first arm, a second segment connected to the second arm wherein the first segment is pivotably connected to the second segment. Additionally, the apparatus for expanding and retracting the first arm and the second arm with respect to each other can further comprise a lever connected to the first segment for pivoting the first segment with respect to the second segment.

The second detachable connector can be a clamp configured to lock onto a side wall of the first mobile platform. The clamp can include a moveable jaw and a toggle for moving the jaw to and from a locking position. The clamp can also include a post for coupling the first detachable connector to the second detachable connector.

In one instance of the invention, the first detachable connector can also be a clamp configured to lock onto a side wall of a mobile platform. In this instance, the first detachable connector and second detachable connector can be tethered together by a flexible strap.

In another instance of the invention the first detachable connector includes a first arm having an outwardly directed pin, a second end having an outwardly directed pin and an apparatus for moving the first arm and second arm into an expanded position and a retracted position for engaging and disengaging the first mobile platform, and the second detachable connector includes a first arm having an outwardly directed pin, a second end having an outwardly directed pin and an apparatus for moving the first arm and second arm into an expanded position and a retracted position for engaging and disengaging the second mobile platform. In this instance, the first detachable connector can be rotatably connected to the second detachable connector.

In accordance with another aspect of the invention, a detachable dolly train connector comprises a clamp having a jaw movable from a first non-engaging position to a second engaging position with a first mobile platform and an expandable connector coupled to the clamp. The expandable connector includes a first arm having a pin extending from the first arm and a second arm having a pin extending from the second arm where the first and second arms movable from a first non-engaging position to a second engaging position with a second mobile platform.

The jaw of the clamp can include a first wall and a second wall parallel to the first wall and a toggle to move the first wall closer to the second wall. The clamp can also include a post.

The expandable connector can include a first bar connected to the first arm and a second bar connected to the second arm wherein the first bar is rotatably connected to the second bar. The expandable connector can also include a lever connected to the first bar. Additionally, the expandable connector can include an aperture configured to engage the post on the clamp.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
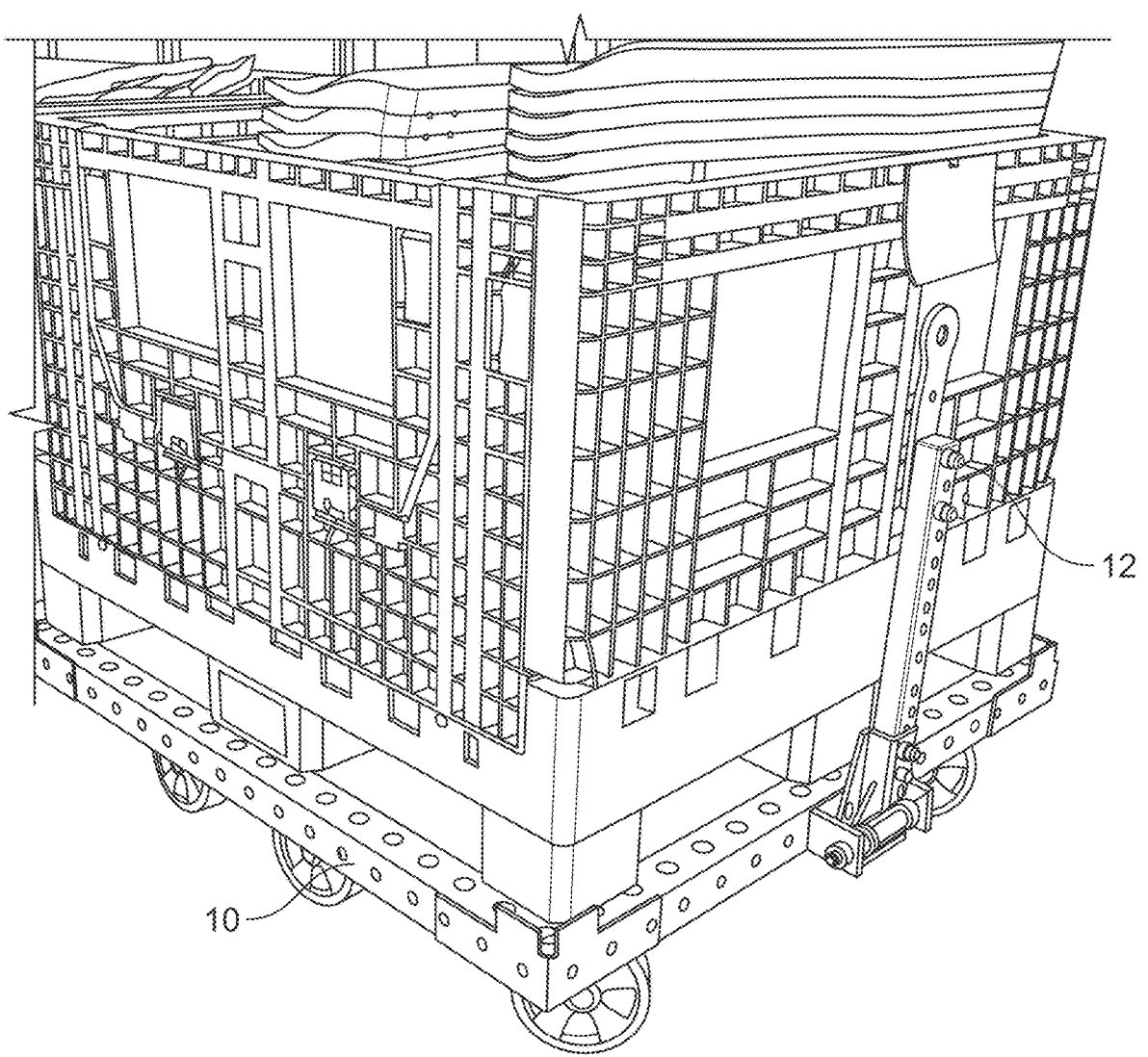
FIG. 1 is a perspective view of a known mobile platform (e.g., a dolly) with a fixed tongue train mechanism.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
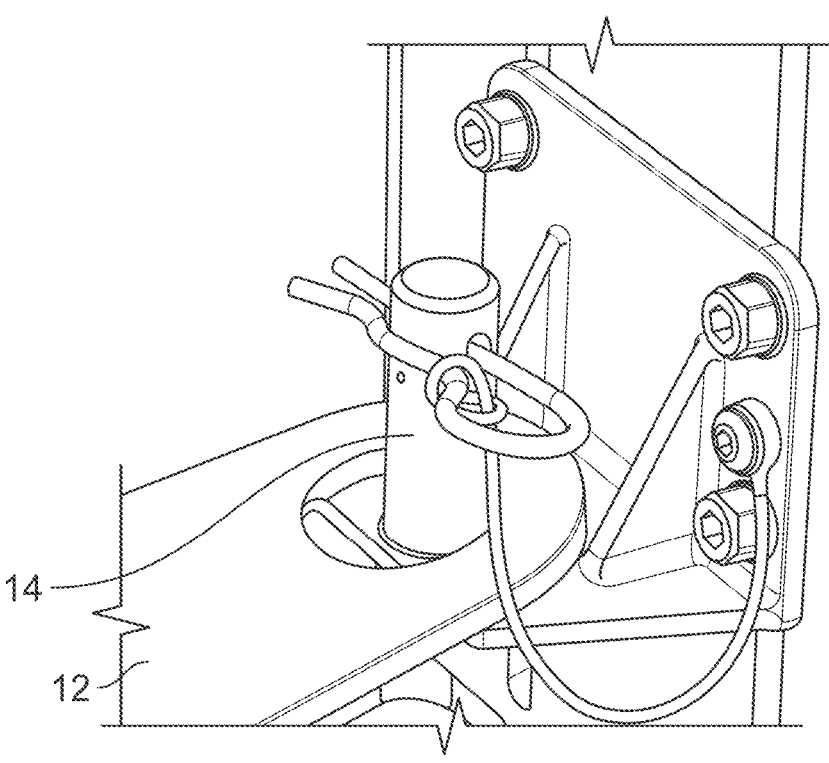
FIG. 2 is a perspective view of a known mobile platform with a fixed pin hitch securing a tongue from another mobile platform.
Figure 3:
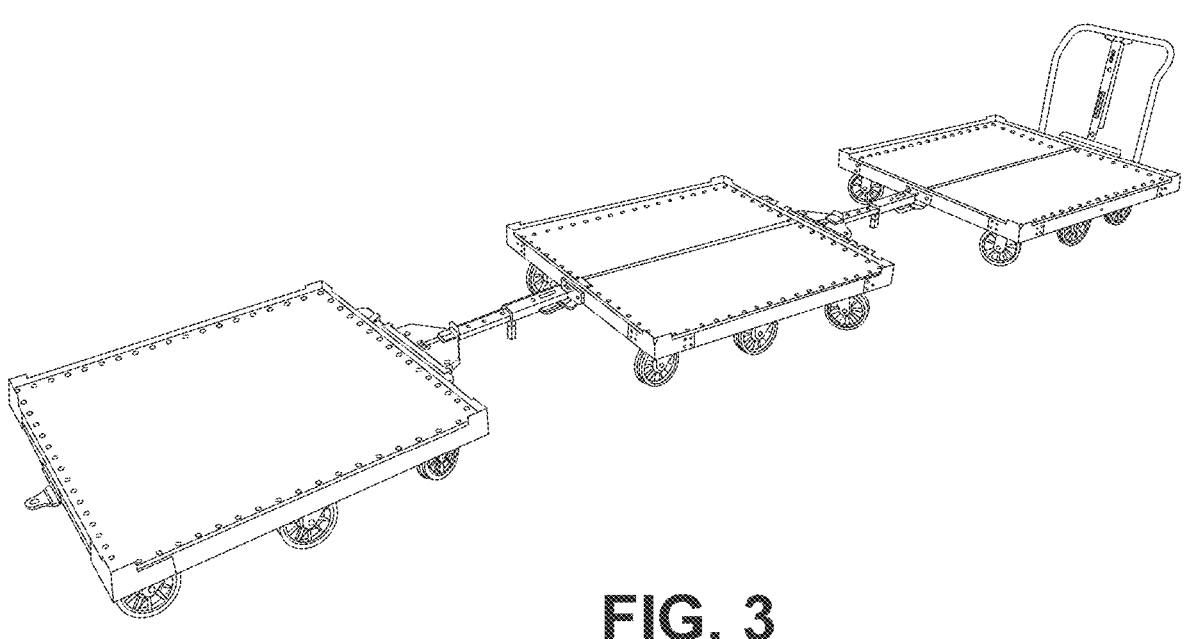
FIG. 3 is a perspective view of a train of known mobile platforms using fixed tongues and pin hitches.

Known mobile platforms 10 (e.g., a dolly) have included fixed structures to enable the platforms to be trained together (i.e., each platform connected to another to form a train of platforms). On one side of the platform 10 would include a fixed tongue 12 that was mounted so that it could pivot downwardly when needed, and raised when not in use as shown in FIG. 1. The mobile platform 10 in FIG. 1 includes a flat support surface (here, supporting a bulk bin) and a plurality of wheels extending below the surface. On the other side, the platform 10 would include a fixed pin hitch 14 for receiving a tongue 12. As shown in FIG. 2, the fixed tongue 12 of one mobile platform 10 can interact with a fixed pin hitch 14 of another mobile platform 10 to couple the platforms 10 together in a train. Other mobile platforms 10 could be added in a like manner as illustrated in FIG. 3. In each instance, the mobile platform 10 must be previously fitted with the tongue 12 and pin hitch 14 regardless of whether it was going to be used in a train or not.

The present invention can turn a mobile platform into one that can be connected in a train without requiring the platform to have any previously installed hardware (i.e., a tongue and pin hitch) already in place. The present invention provides several mechanisms in the form of expandable and retractable connectors that can be detachably connected to a mobile platform and enable the platform to form a train with another platform.

Figure 4:
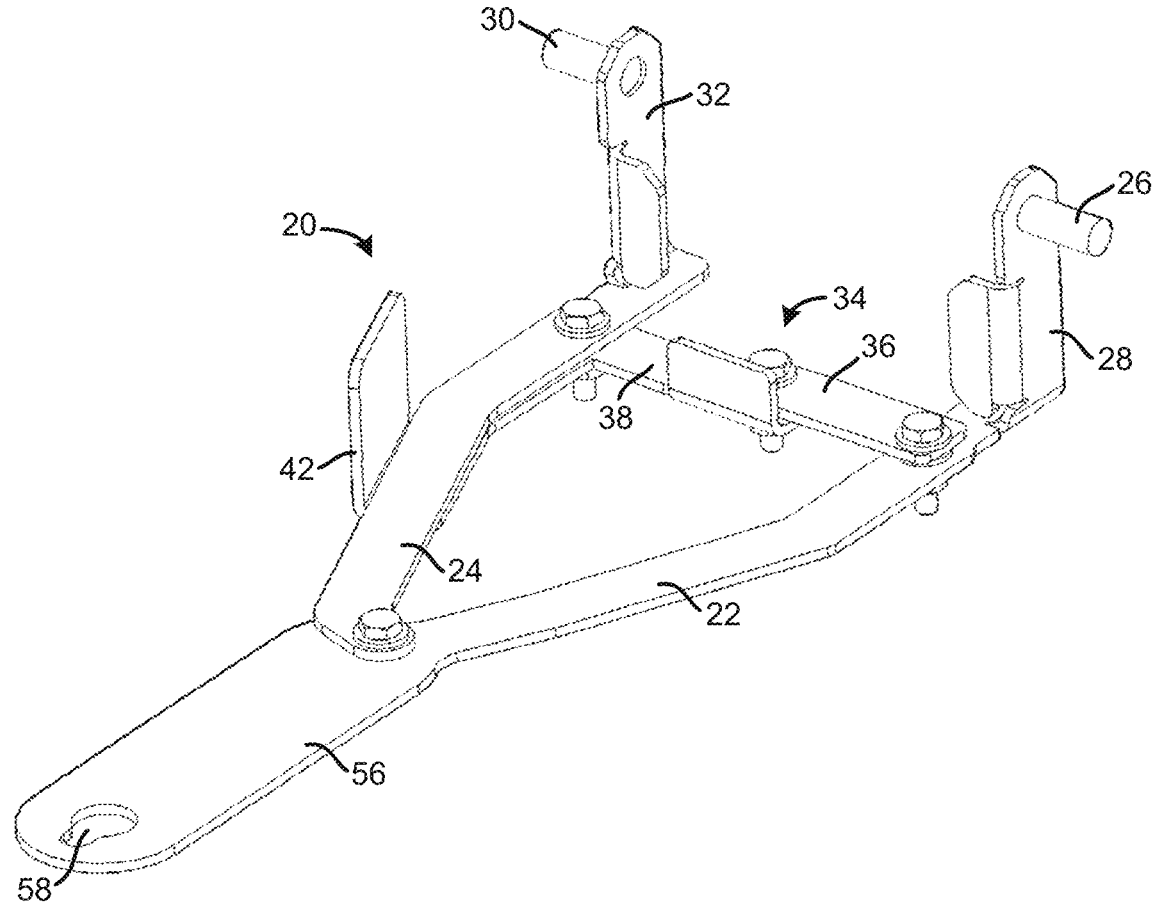
FIG. 4 is an upper perspective view of a first detachable connector in accordance with an aspect of the present invention.
Figure 5:
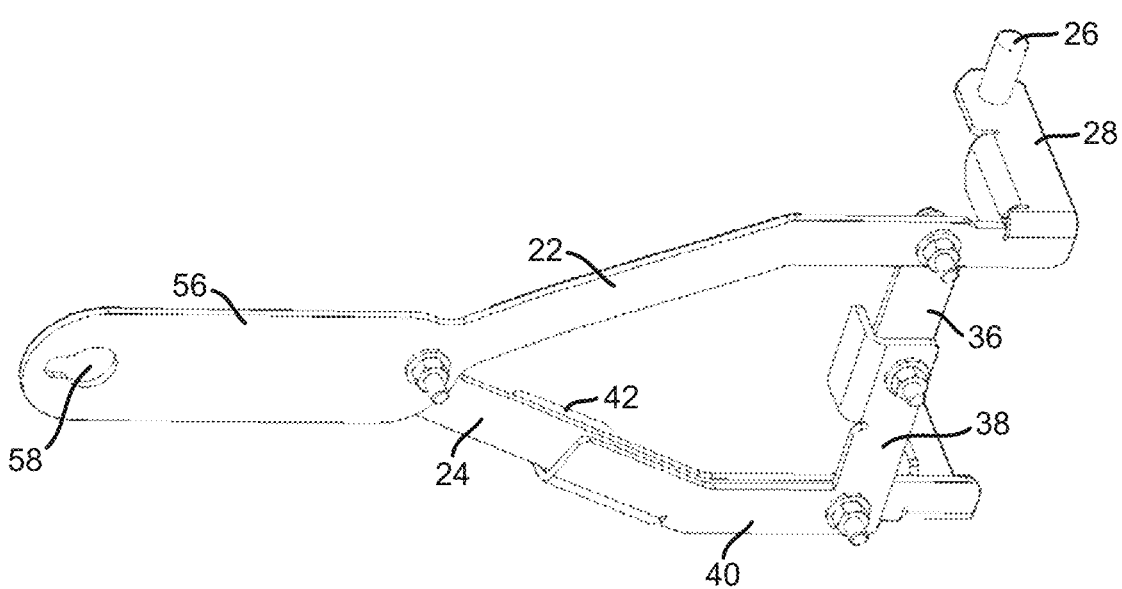
FIG. 5 is a lower perspective view of the first detachable connector of FIG. 4.

FIGS. 4 and 5 show a first detachable connector 20 that can be used with a mobile platform. The first detachable connector 20 includes a first arm 22 and a second arm 24 rotatably connected to the first arm 22. From the connection between the arms 22, 24, each arm extends away from the other to a portion generally parallel to the other arm. The first arm 22 includes a first outwardly directed pin 26 at one end (distal from the connection to the second arm 24). The pin 26 is held by a first extension 28. The second arm 24 includes a second outwardly directed pin 30 at one end (again, distal from the connection with the first arm 22) held by a second extension 32.

The first detachable connector 20 includes an apparatus 34 to enable the arms 22, 24 holding the first and second pins 26, 30 to retract and expand with respect to each other. The apparatus 34 includes a first plate 36 rotatably connected at a first end to the first arm 22 and a second plate 38 rotatably connected at a first end to the second arm 24. The first plate 36 is also rotatably connected at a second end to a second end of the second plate 38. The first and second plates 36, 38 extend between the parallel end portions of the first and second arms 22, 24.

A lever 40 with a handle 42 is fixedly connected to the first end of the second plate 38 (in fact, the lever 40 and second plate 38 can be a single piece of material). As shown in FIGS. 4 and 5, the lever 40 conforms to the shape of the second arm 24 and is flush with the arm 24 when the apparatus 34 is in an expanded position. The handle 42 is designed to stop the lever 40 from moving more than flush with the second arm 24.

Figure 6:
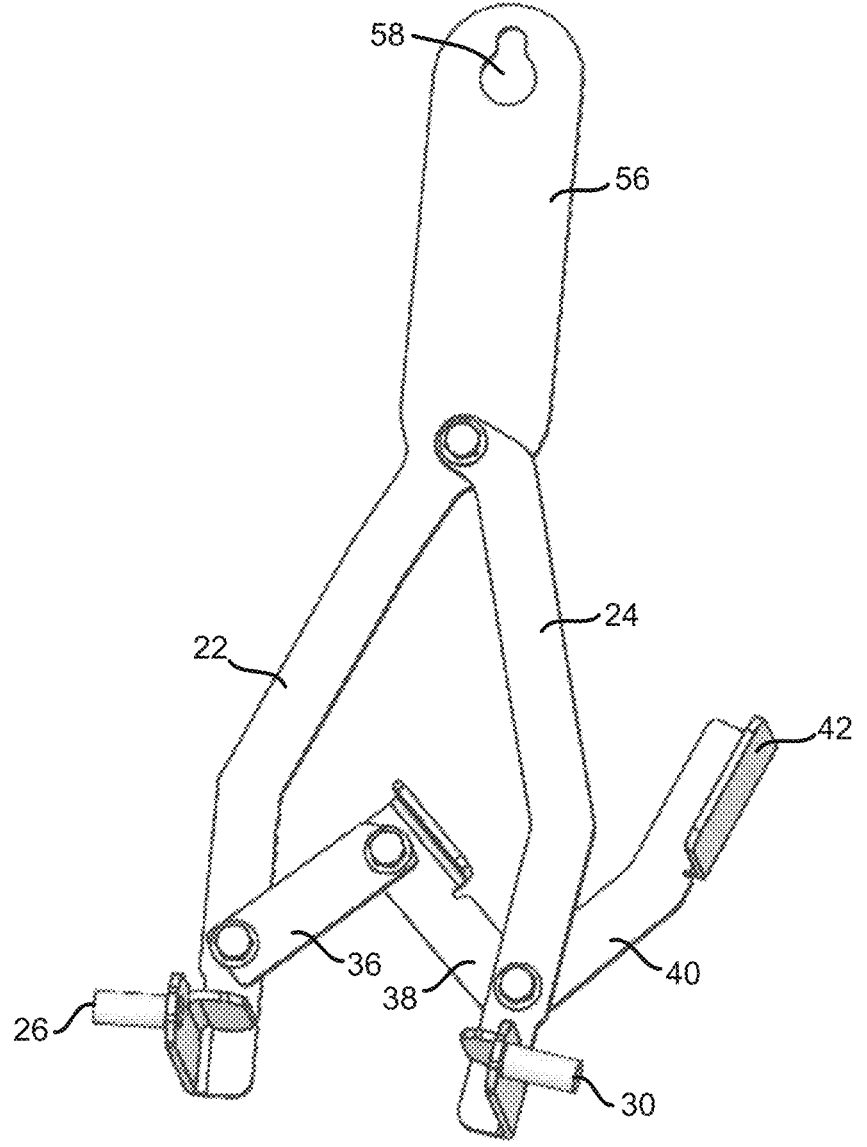
FIG. 6 is a top view of the first detachable connector of FIG. 4 in a retracted position.
Figure 7:
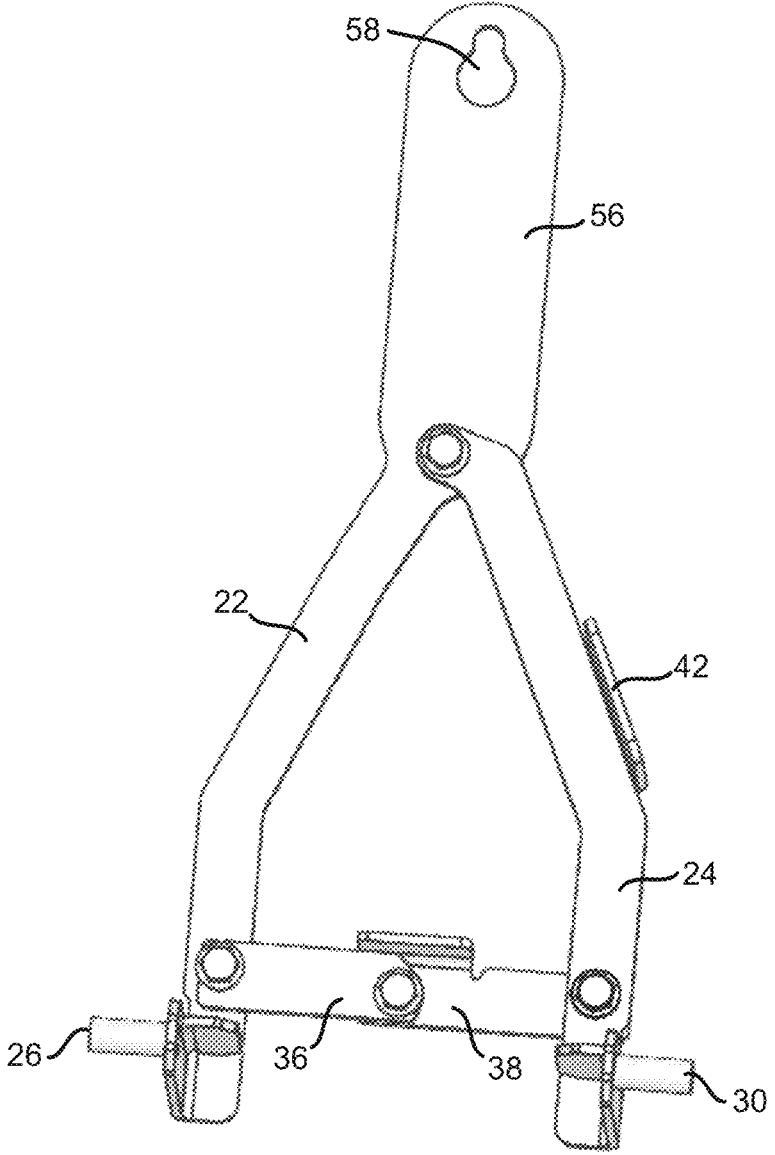
FIG. 7 is a top view of the first detachable connector of FIG. 4 in an expanded position.

As illustrated in FIGS. 6 and 7, moving the lever 40 outward from the second arm 24 causes the second plate 38 and first plate 36 to pivot about their second ends and with the arms 22, 24, and retract the outwardly directed pins 26, 30 toward each other. Moving the lever 40 back toward the second arm 24 moves the first and second plates 36, 38 back, and expands the outwardly directed pins 26, 30.

Figure 8A:
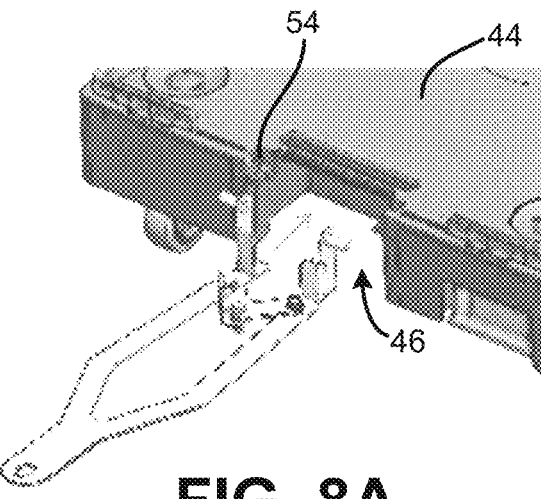
FIGS. 8A-8C are perspective views of the first detachable connector being attached to a mobile platform.
Figure 8B:
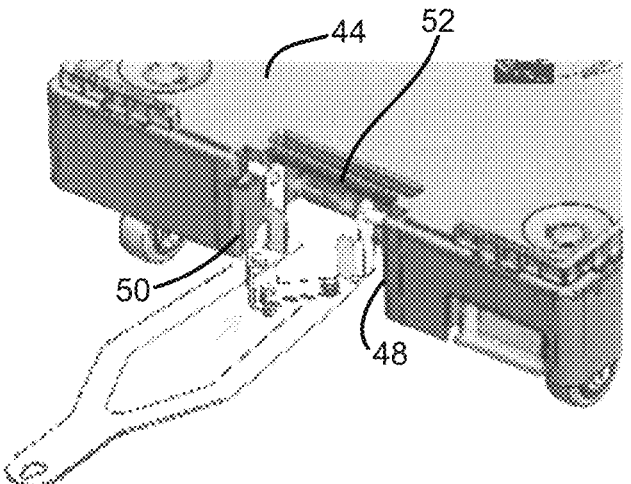
Figure 8C:
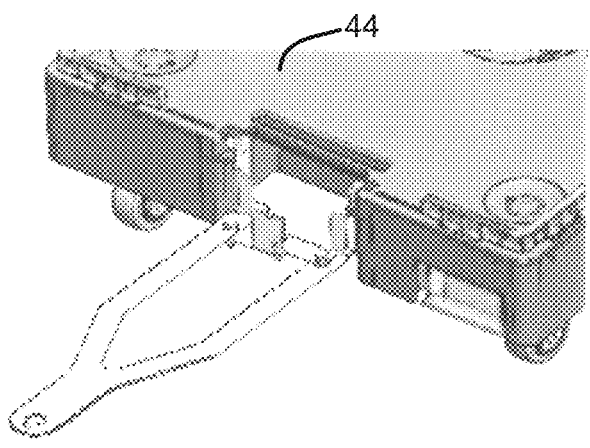

The retracting and expanding pins 26, 30 can be used to connect the first detachable connector 20 to a mobile platform 44 as shown in FIGS. 8A-8C. As shown, the mobile platform 44 includes a rectangular indented portion 46 on one side of the platform 44 having two side panels 48, 50 and a back panel 52. Each of the side panels 48, 50 includes an opening 54 sized to receive a pin from the first detachable connector 20 (these openings are also designed to connect to a handle that can be used with the mobile platform). To attach to the mobile platform 44, the lever 40 of the first detachable connector 20 is moved to a retracted position and the end portion containing the pins 26, 30 of the first detachable connector 20 is inserted into the indented portion 46. The pins 26, 30 are aligned with the openings 54 and the lever 40 is moved back to expand the first detachable connector 20 and engage the pins 26, 30 in the openings 54. The first detachable connector 20 is detached in a similar process by moving the lever 40 to the retracted position and then removing the first detachable connector 20 from the indented portion 46.

Referring back to FIGS. 4 and 5, the first detachable connector 20 includes a tongue extension 56 from the connection between the first arm 22 and the second arm 24. In the embodiment shown, the extension 56 is part of (i.e., integral with) the first arm 22, however, the extension 56 can be a separate piece connected to the first arm 22 and/or the second arm 24. The extension 56 includes a keyhole shaped opening 58. The opening 58 is sized to slip over a hitch pin (such as that of the second detachable connector discussed herein, or a known platform having a fixed hitch pin). The keyhole shape limits the ability of the tongue extension 56 from disengaging the pin when moving forward in a train.

While the apparatus for retracting and expanding the arms 34 is shown with a lever 40 and pivotable plates 36, 38, other structures can be used. For example, a spring activated structure can be used. Additionally, structures that move just the pins 26, 30 and/or the extensions 28, 32 without moving the arms could be used. In this latter instance, the pins 26, 30 and extensions 28, 32 can be on a single structure (e.g., a T-shaped plate) rather than separate arms.

Figure 9:
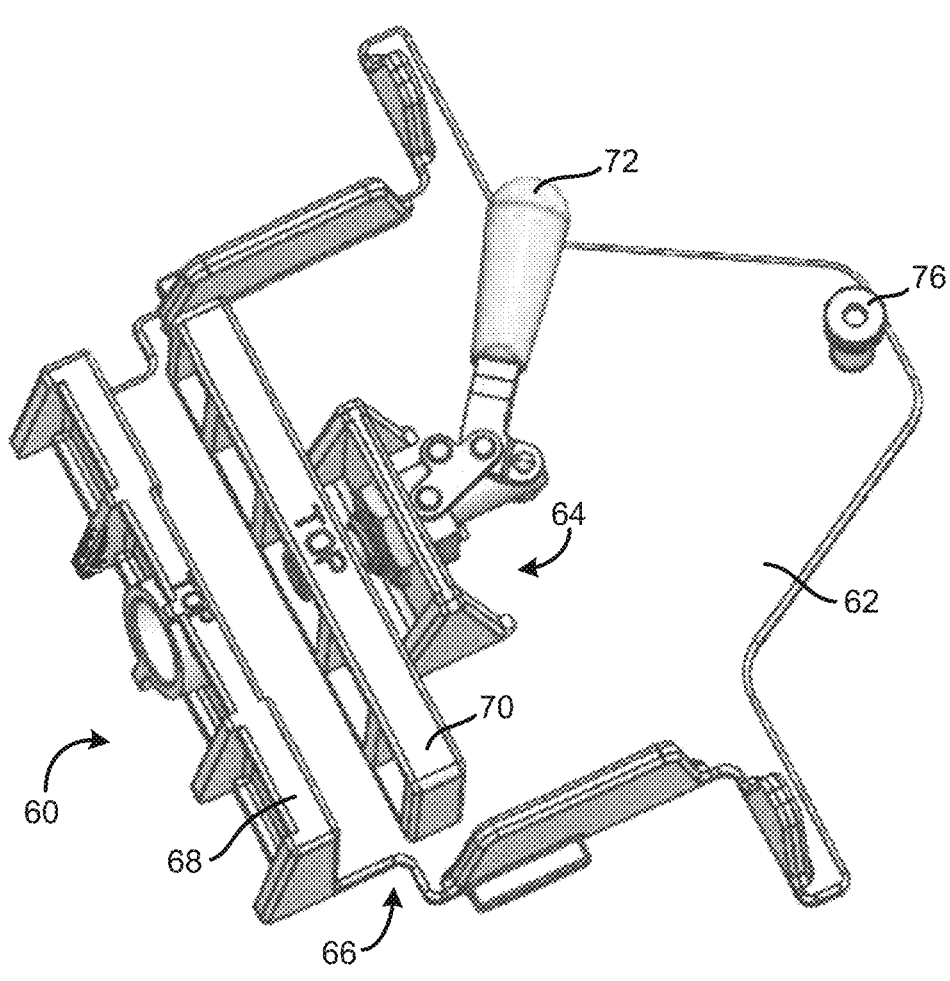
FIG. 9 is a perspective view of a second detachable connector in accordance with an aspect of the present invention in an open position.
Figure 10:
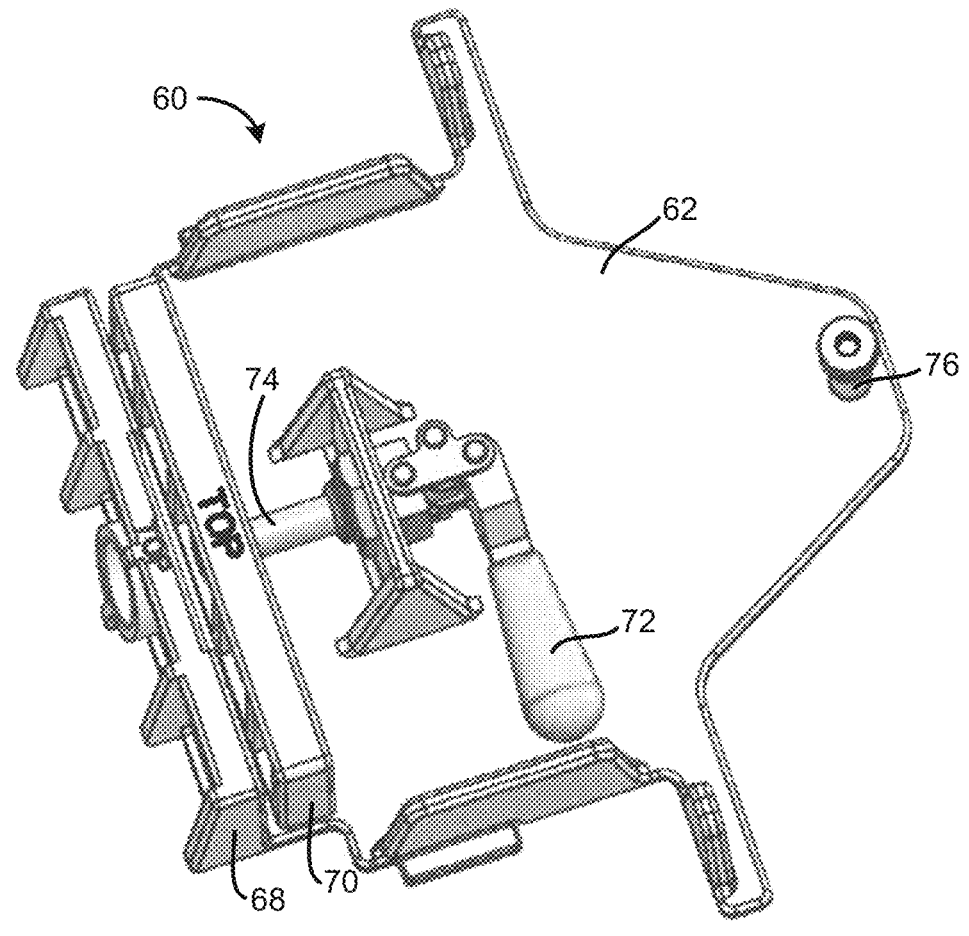
FIG. 10 is a perspective view of the second detachable connector in a closed position.

A second detachable connector 60 is shown in FIGS. 9 and 10. The second detachable connector 60 includes a generally flat support plate 62 having an upper surface. A clamping mechanism 64 is connected to the upper surface of the support plate 62. The clamping mechanism 64 includes a movable jaw 66 having a fixed outer wall 68 and a movable inner wall 70. A toggle 72 is used to move a piston 74 which is connected to the inner wall 70. The piston 74 moves the inner wall 70 toward or away from the outer wall 68. In this manner, the clamping mechanism 64 can be used to engage or disengage the jaw 66 from a wall of a mobile platform. FIG. 9 shows the walls 68, 70 of the jaw 66 away from each other in a disengaged position, and FIG. 10 shows the walls 68, 70 close to each other in an engaged position.

The second detachable connector 60 also includes a pin hitch 76 extending upward at one end of the support plate 62.

Figure 11A:
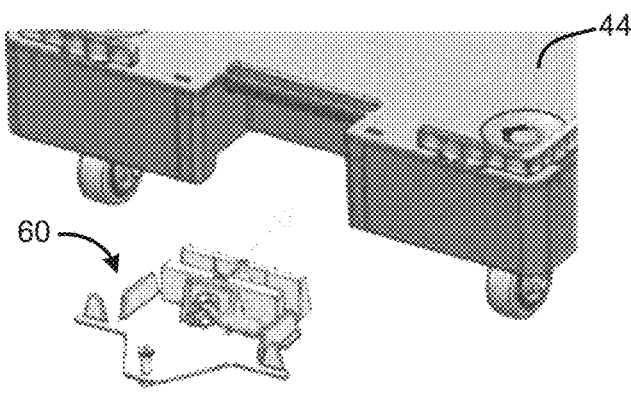
FIGS. 11A-11C are perspective views of the second detachable connector being attached to a mobile platform.
Figure 11B:
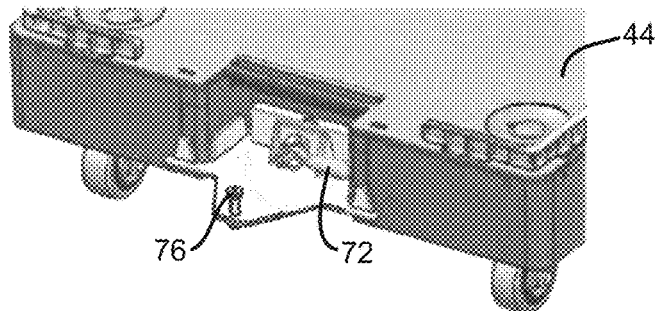
Figure 11C:
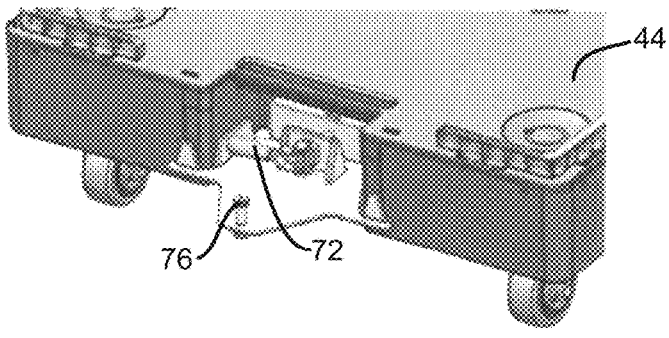

FIGS. 11A-11C illustrate connecting the second detachable connector 60 to the mobile platform 44. As shown in FIG. 11A, the second detachable connector 50 is moved to a wall (e.g., wall 52) of the mobile platform 44 with the jaw 66 in an open position. As shown in FIGS. 11B and 11C, the toggle 72 is moved from a first (open) position to a second (closed) position to move the inner wall 70 toward the outer wall 68 to clamp the jaw 66 to the wall of the mobile platform 44. Reversing movement of the toggle (from the second position to the first position) will disengage the second detachable connector 60 from the mobile platform 44.

Figure 12:
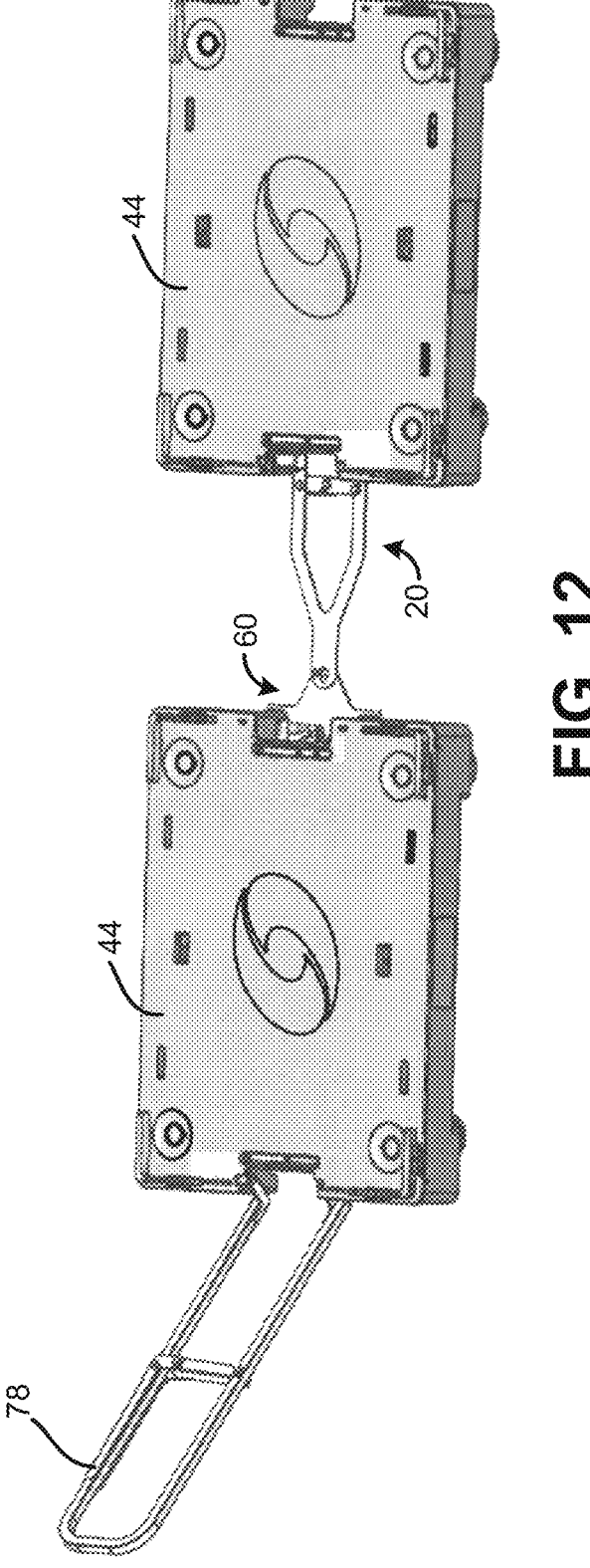
FIG. 12 is a perspective view of two mobile platforms trained together with a first detachable connector and a second detachable connector.
Figure 13A:
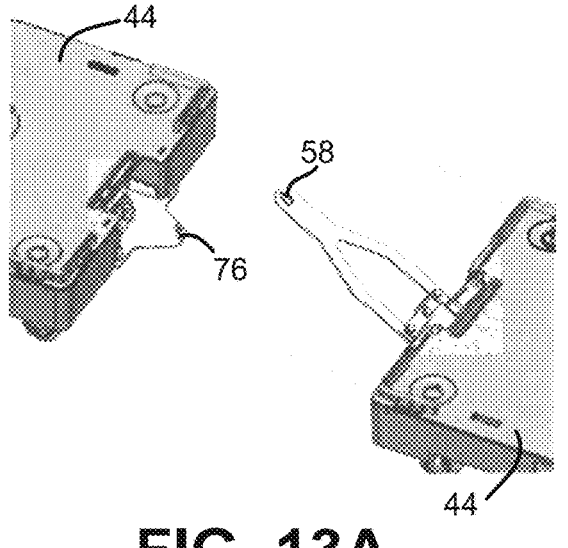
FIGS. 13A-13C are perspective views of the first detachable connector on one mobile platform being coupled to a second detachable connector on another mobile platform.
Figure 13B:
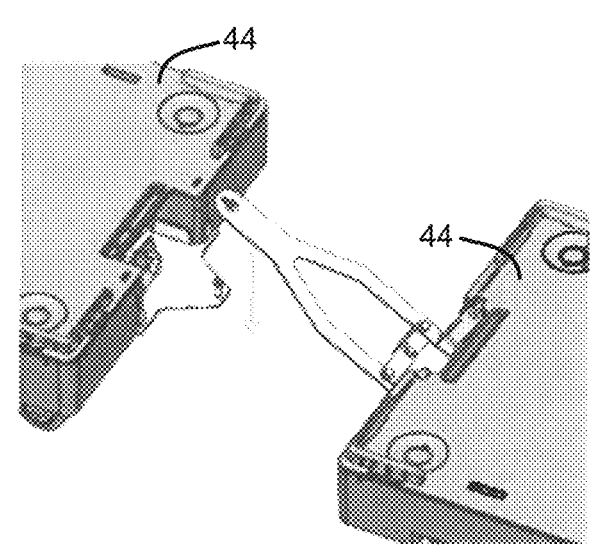
Figure 13C:
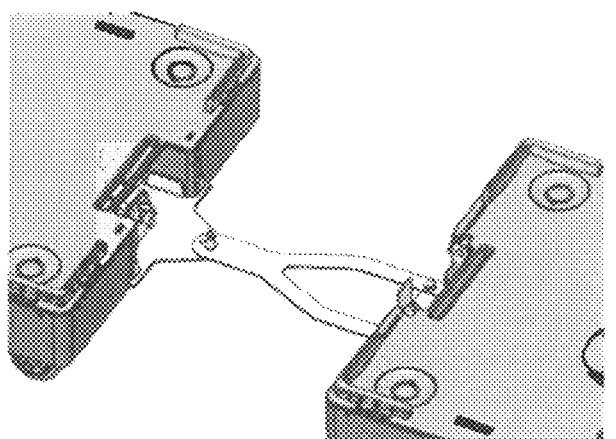

The first detachable connector 20 and the second detachable connector 60 can be coupled together as shown in FIG. 12, and further illustrated in FIGS. 13A-13C, to form a train connection between two mobile platforms 44 (without requiring the mobile platforms 44 to have any preinstalled hardware). Specifically, the tongue extension 56 and keyhole 58 of the first detachable connector 20 are tilted upward and then lowered over the pin hitch 76 of the second detachable connector 60 to couple the connectors 20, 60. Reversing this process will decouple the connectors 20, 60.

As shown, the first mobile platform 44 (i.e., leftmost in FIG. 12) includes a handle 78 to enable a user to pull the train of platforms 44. Additional mobile platforms 44 can be added to the train in a similar manner.

Figure 14:
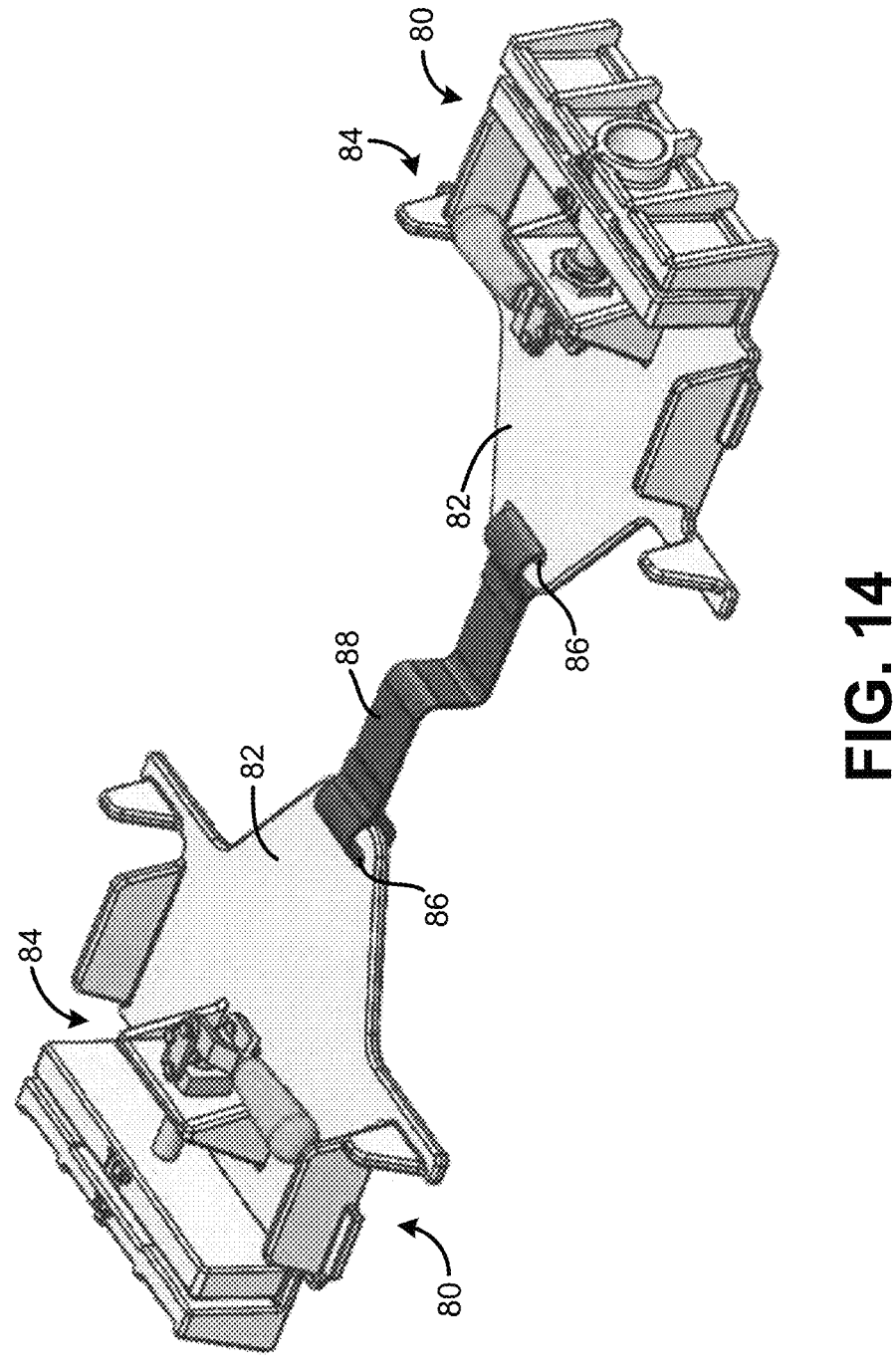
FIG. 14 is a perspective view of one second detachable connector tethered to another second detachable connector.

FIG. 14 shows a slightly modified detachable connector 80 (similar to the second detachable connector discussed above) connected to another slightly modified detachable connector 80. Both connectors 80 include a support plate 82 with a clamping mechanism 84. However, instead of a pin hitch, the support plate 82 includes an opening 86 for receiving an end of a flexible strap 88. The flexible strap 88 tethers the two modified second detachable connectors 80 together. Each modified detachable connector 80 can then be connected to a separate mobile platform 44.

Figure 15:
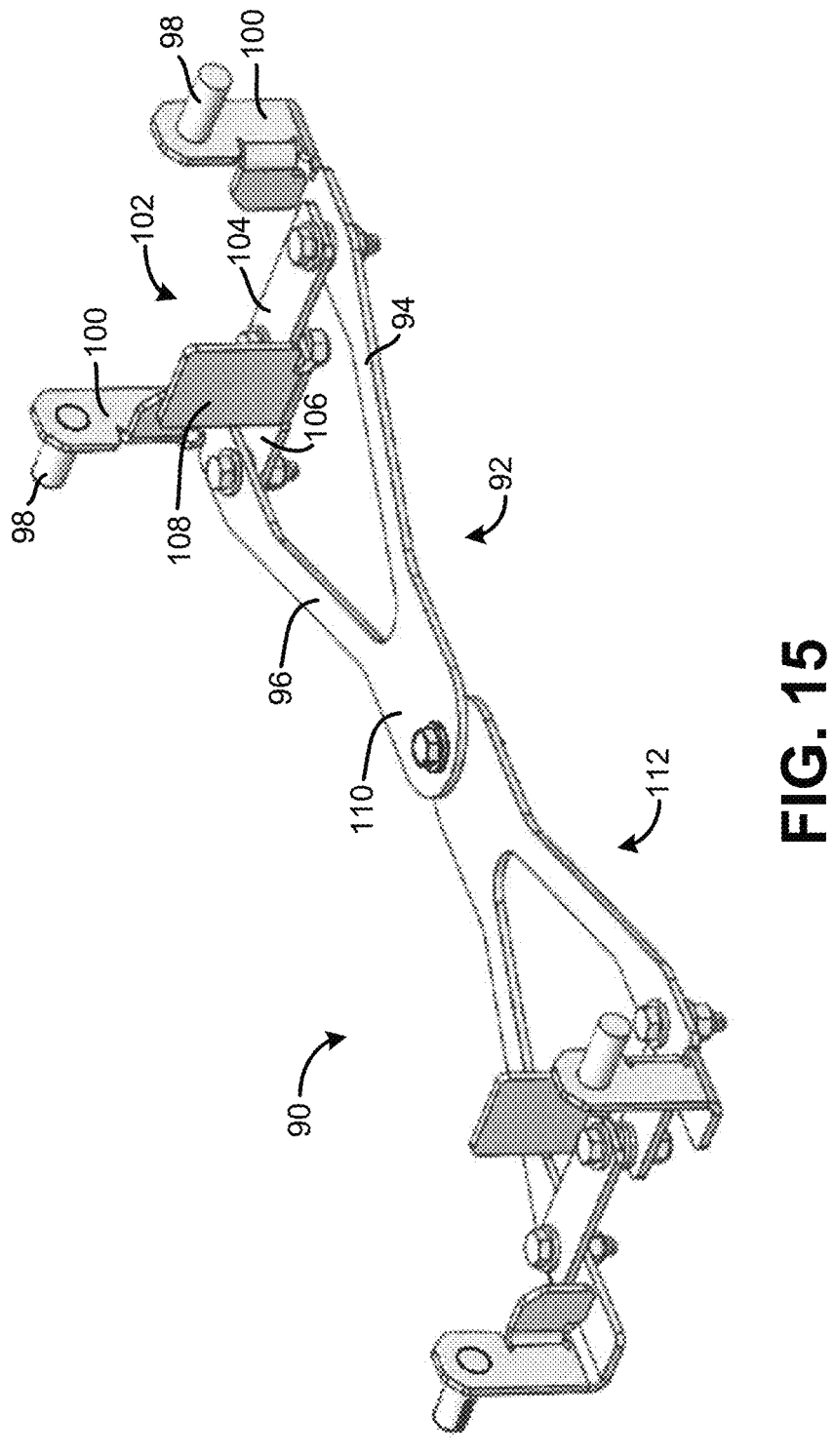
FIG. 15 is a perspective view of a modified first detachable connector rotatably connected to another modified first detachable connector.

FIG. 15 shows another modified version of a detachable connector 90 (having some similarities to the first detachable connector discussed above) that can be connected to two mobile platforms 44. The modified detachable connector 90 includes a first end portion 92 having a first arm 94 and a second arm 96. Each arm 94, 96 supports an outwardly directed pin 98 on an extension 100. An apparatus 102 for retracting and expanding the pins extends between the arms 94, 96. The apparatus 102 includes a first plate 104 pivotally connected at a first end to the first arm 94, and a second plate 106 pivotally connected at a first end to the second arm 96. The first plate 104 and the second plate 106 are pivotally connected to each other at a second end of each plate 104, 106. A handle 108 connected to the second plate 106 can be used to move the plates 104, 106 and retract or expand the pins 98.

The first end 92 portion includes an extension 110 from the arms 94, 96 that is connected to a second end portion 112 identical to the first end portion 92. Both end portions 92, 112 can be connected to two mobile platforms 44 in a similar manner as that discussed with respect to the first detachable connector 20.

Figure 16:
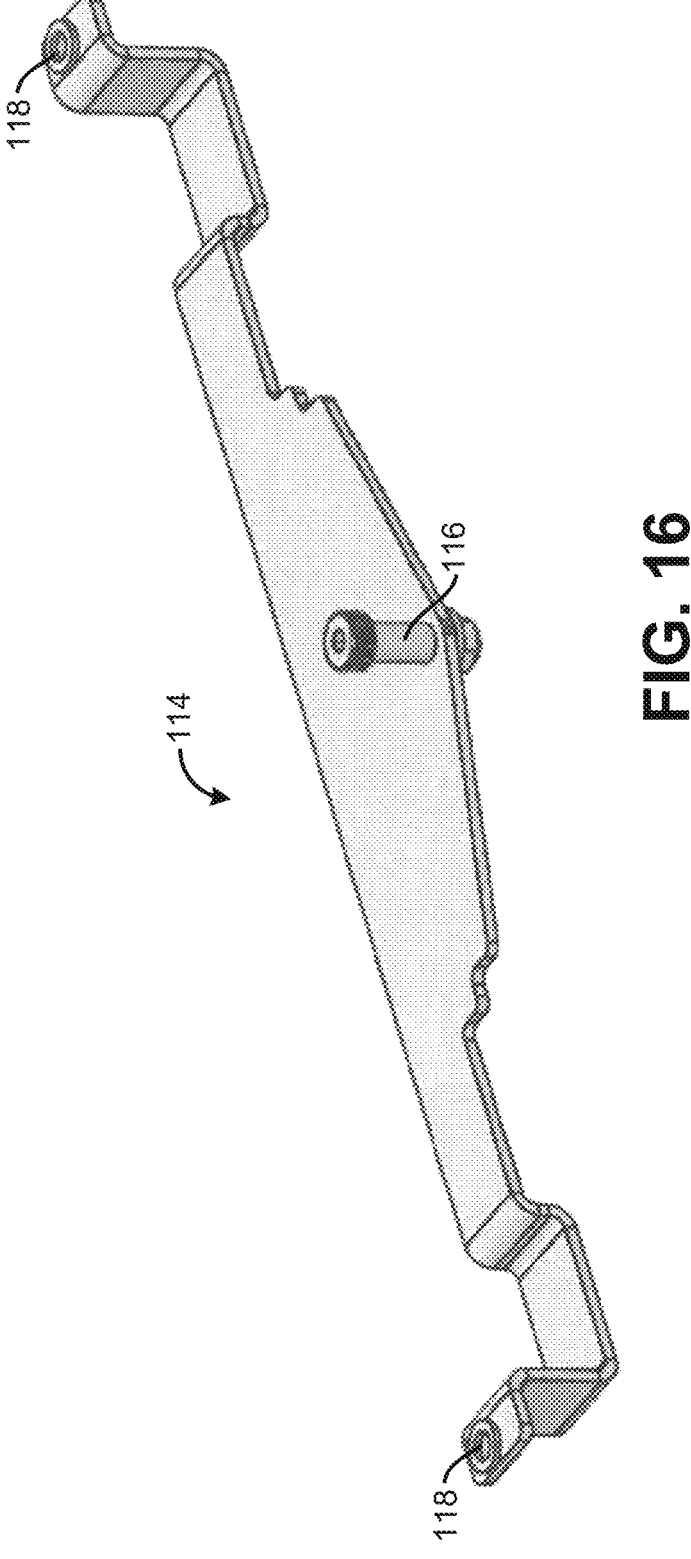
FIG. 16 is a perspective view of a fixed connector that can be used in combination with a first detachable connector; and, FIG. 17 is a perspective view of the fixed connector of FIG. 16 connected to a mobile platform.
Figure 17:
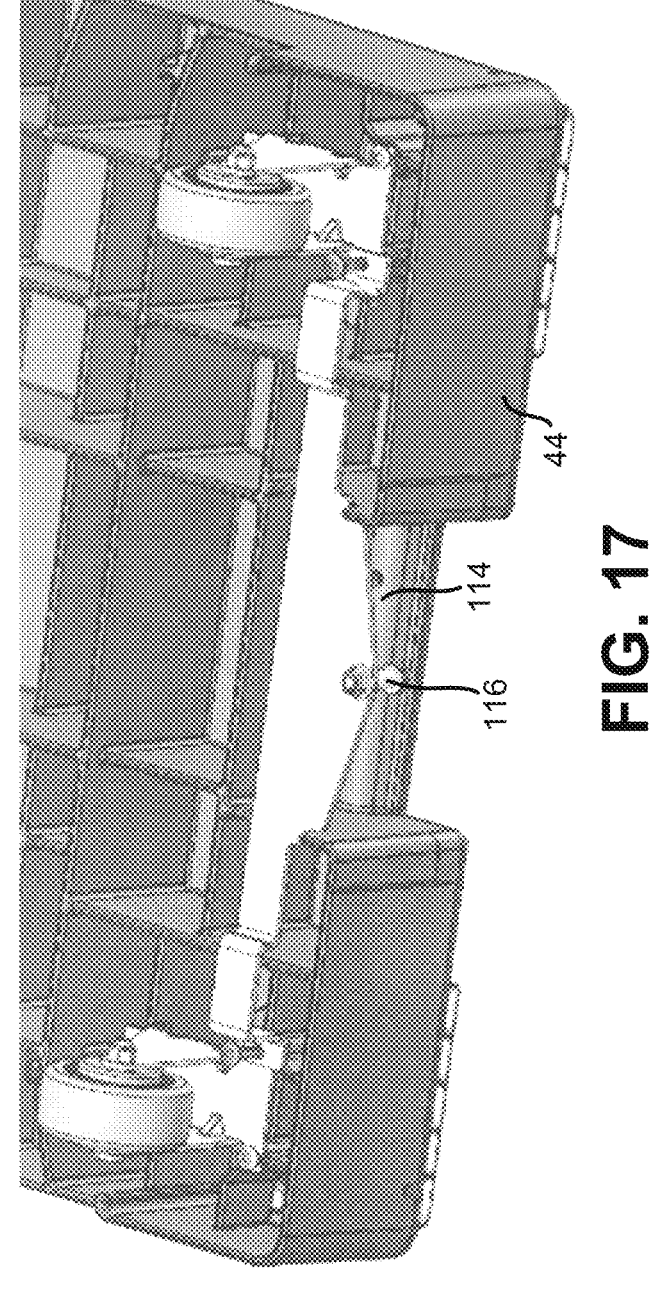

FIGS. 16 and 17 show a connector portion 114 that can be semi-permanently attached to a mobile platform. The connector portion 114 includes a pin hitch 116 that can be used with the first detachable connector. The connector portion 114 can be connected to the mobile platform 44 by screws through holes 118 at either end of the portion 114.

Many modifications and variations of the present invention are possible in light of the above teachings. It is, therefore, to be understood within the scope of the appended claims the invention may be protected otherwise than as specifically described.

I claim:

1. A detachable dolly train connector comprising:
   a clamp having a jaw movable from a first non-engaging position to a second engaging position with a first mobile platform, wherein the jaw of the clamp includes a first wall and a second wall parallel to the first wall and wherein the clamp includes a toggle to move the first wall closer to the second wall and wherein the clamp includes a post; and,
   an expandable connector coupled to the clamp, the expandable connector including a first arm having a pin extending from the first arm and a second arm having a pin extending from the second arm, the first and second arms movable from a first non-engaging position to a second engaging position with a second mobile platform, wherein the expandable connector includes a first bar connected to the first arm and a second bar connected to the second arm wherein the first bar is rotatably connected to the second bar.

2. The detachable dolly train connector of claim 1 wherein the expandable connector includes a lever connected to the first bar.

3. The detachable dolly train connector of claim 1 where the expandable connector includes an aperture configured to engage the post on the clamp.

* * * * *